Patented June 17, 1924.

1,498,386

UNITED STATES PATENT OFFICE.

LESTER KIRSCHBRAUN, OF CHICAGO, ILLINOIS, ASSIGNOR TO THE RAYBESTOS COMPANY, OF BRIDGEPORT, CONNECTICUT, A CORPORATION OF CONNECTICUT.

PROCESS OF MAKING FRICTION FACINGS.

No Drawing. Application filed August 16, 1920, Serial No. 404,011. Renewed December 31, 1921. Serial No. 526,417.

*To all whom it may concern:*

Be it known that I, LESTER KIRSCHBRAUN, a citizen of the United States, residing in the city of Chicago, county of Cook, and State of Illinois, have invented certain new and useful Improvements in Processes of Making Friction Facings, of which the following is a specification.

This invention relates to friction facing and process of making same and refers more particularly to a friction facing adapted as a clutch ring in the clutches of motor vehicles or the like.

The object of the invention is to provide a ring which will have the necessary coefficient of friction, tensile strength and Brinnell hardness while at the same time permitting the use of cheap binders or saturants.

The invention may be carried out as follows: I take asbestos pulp and mix with it about 5% of phenol resin in pulverized form. I then form this pulp into sheets, as for example asbestos millboards, and cut out from the sheets the friction rings and other friction elements. These rings are properly calendered and sized in the usual way and are then immersed in the saturating solution. This saturating solution may be either asphalt in liquid condition, as for example, very low melting point Mexican or California asphalt, say 100° melting point or less. This asphalt is preferably cut back in the solvent or vehicle, such as gas oil, gasoline, benzol, toluol or the like. If it is desired to saturate the friction elements at an elevated temperature, it is preferable that a high boiling point solvent, such as gas oil, be used. These facings may be retained in the saturating solution for some two hours and then removed and taken to a baking oven. Here the rings are subjected to a baking at a temperature of between 400° and 500° F. for a period of twenty four hours, more or less. It is particularly desirable that the temperature be properly controlled within given limits in order to obtain a product of the desired strength and hardness. By using the phenol resin a much harder and stronger product is obtained than where asphalt is used alone, but by far the greater percentage of the retained saturant in the finished product is the relatively cheap asphalt. By means of this process, a product having a tensile strength in excess of 2,000 pounds per square inch and a Brinnell hardness in excess of 15 may be obtained.

I claim as my invention:

1. A process of making friction facings, consisting in mixing relatively incombustible fibrous pulp with comminuted phenol resin, forming this into sheets, cutting friction elements therefrom, saturating these elements with a binder composed essentially of asphalt, removing the friction elements from the saturating bath and subjecting them to a baking action at controlled temperatures.

2. A process of making friction facings, consisting in mixing relatively incombustible fibrous pulp with comminuted phenol resin, forming this into sheets, cutting friction elements therefrom, saturating these elements with a binder composed essentially of asphalt, removing the friction elements from the saturating bath and subjecting them to a baking action at controlled temperatures and then continuing the baking until a friction element has been obtained having a tensile strength in excess of 2000 pounds to the square inch and having a Brinnell hardness in excess of 10.

LESTER KIRSCHBRAUN.